J. TOTH & J. NOVAK.
SPRING WHEEL.
APPLICATION FILED APR. 3, 1917.

1,237,416.

Patented Aug. 21, 1917.
2 SHEETS—SHEET 1.

Inventors
J. Tóth
J. Novak

By N. M. Wilson

Attorney

J. TÓTH & J. NOVAK.
SPRING WHEEL.
APPLICATION FILED APR. 3, 1917.

1,237,416.

Patented Aug. 21, 1917.
2 SHEETS—SHEET 2.

Inventors
J. Tóth
J. Novak

By A. M. Wilson

Attorney

UNITED STATES PATENT OFFICE.

JOHN TÓTH AND JOSEPH NOVAK, OF PHILADELPHIA, PENNSYLVANIA.

SPRING-WHEEL.

1,237,416. Specification of Letters Patent. Patented Aug. 21, 1917.

Application filed April 3, 1917. Serial No. 159,471.

*To all whom it may concern:*

Be it known that we, JOHN TÓTH and JOSEPH NOVAK, subjects of the King of Hungary, residing at Philadelphia, in the county of Philadelphia and State of Pennsylvania, have invented certain new and useful Improvements in Spring-Wheels, of which the following is a specification.

This invention relates to certain new and useful improvements in spring wheels.

The primary object of the invention is the provision of a spring wheel particularly of the class known as block tread wheels, the construction possessing great strength and durability and adapted for the cushioning of the load.

A further object of the device is to provide a vehicle wheel having a block tread, the sections thereof being resiliently supported individually and suitably maintained in their tread formation during the operation of the wheel.

In the drawing forming a part of this application and in which like designating characters refer to corresponding parts throughout the several views:—

Figure 1:
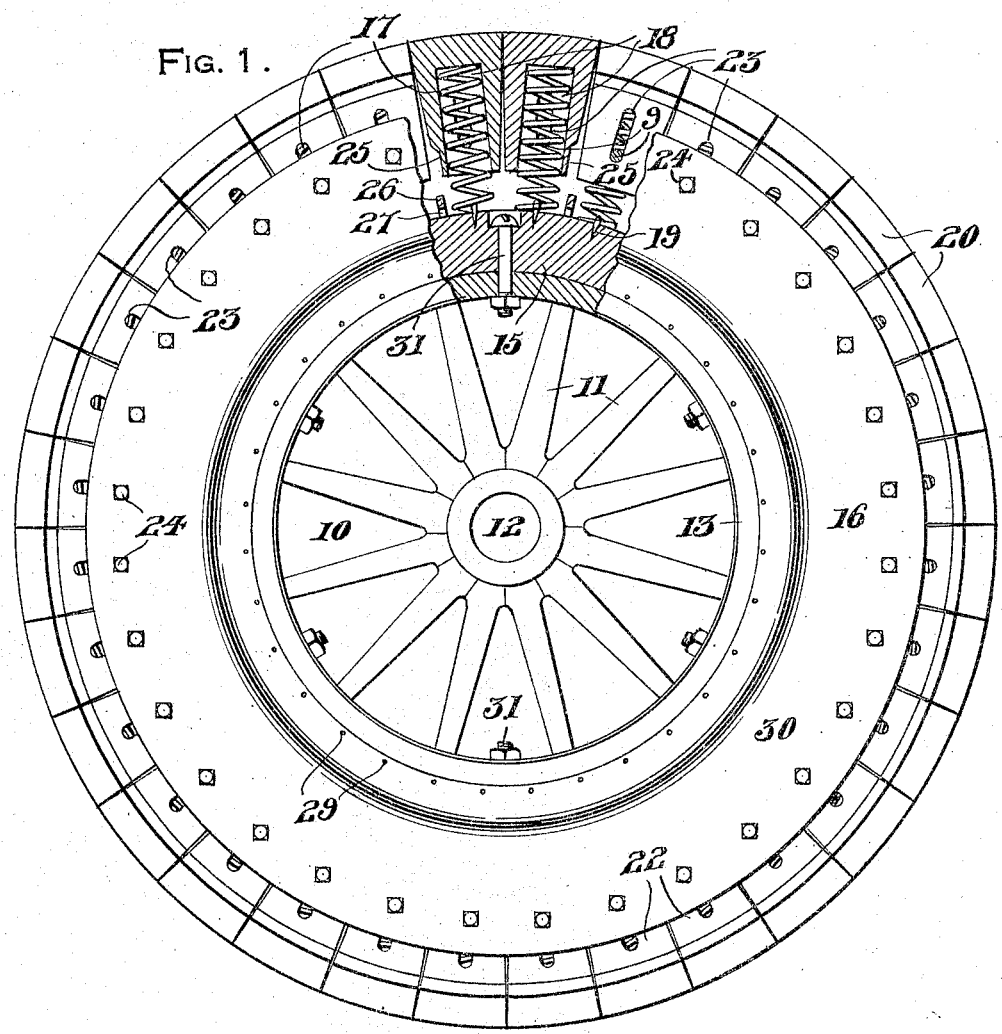
Figure 1 is a side elevation of the device partially broken away.
Figure 2:
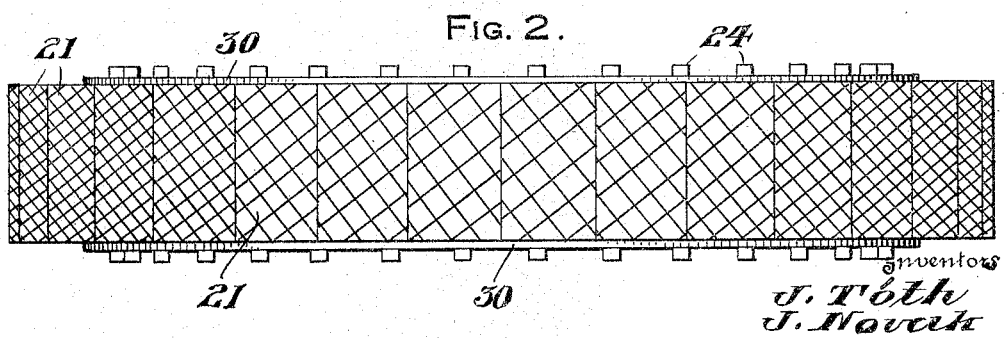
Fig. 2 is a top plan view thereof.
Figure 3:
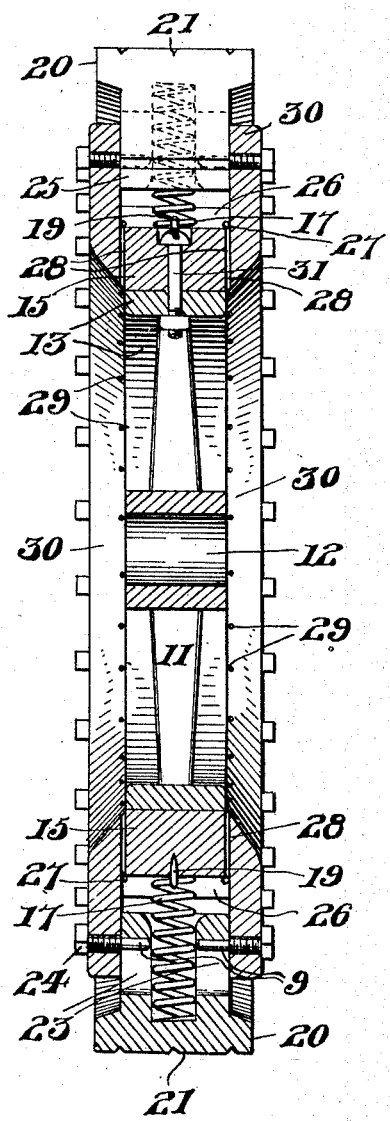
Fig. 3 is a diametrical sectional view of the same.
Figure 4:
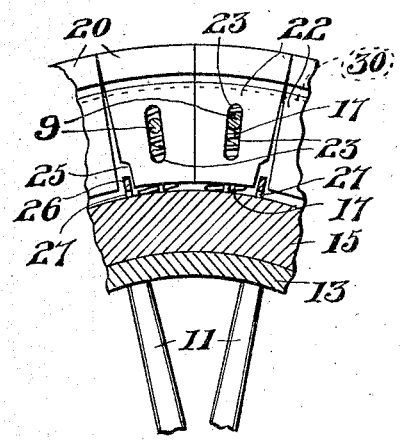
Fig. 4 is a fragmentary sectional view through the outer portion of the device, and, Fig. 5 is a perspective view of one of the tread blocks removed.
Figure 5:
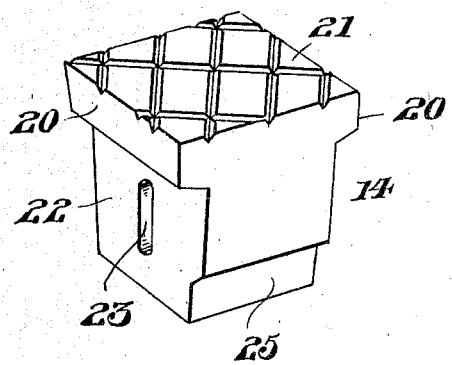

The present form of resilient wheel provides a centrally-arranged complete wheel structure 10 having spokes 11, a hub 12, and a felly 13 while a plurality of tread blocks 14 are maintained peripherally thereof in resilient relations with respect thereto, thereby constituting the complete wheel structure.

A rim 15 is mounted upon the felly 13 having spaced circular side plates 16 secured thereto while the blocks 14 are radially arranged slidably between the plates 16, resiliently mounted upon the rim 15 by means of helical springs 17 fitted within central sockets 18 of the blocks and secured to the rim as at 19.

Each block 14 has a tread plate portion 20, the bearing face 21 of which is suitably roughened, the lateral sides of the plates 20 overlying the rim plates 16. The body-portions 22 of the blocks 14 being narrower than the tread portions 20 are slidable radially between the plates 16.

Elongated slots 23 are provided in the blocks 14 into which the reduced ends 9 of pintle bolts 24 extend, the latter being secured through the opposite side plates 16, it being understood that the tread portions 20 of the adjacent blocks are substantially in contact with each other while sufficient space is arranged between the blocks, as well as the tread plate portions thereof if desired, for permitting the perfect operation of the blocks 14 during the movements of the wheel to give the desired degree of resiliency to the structure. The opposite end portions of each pair of blocks are cut-away as at 25 to allow clearance for partition strips 26 arranged upon the rim 15 between the plates 16, the said partitions being provided for strengthening the structure and having openings 27 therethrough for allowing water to pass to outlet passages 28 in the plates 16 having discharge openings 29 at the inner edges of the inwardly flaring inner peripheries of the said plates 16.

The rim 15 is secured to the felly 13 by means of a plurality of bolts 31, the rim 15 and the entire tread construction being readily removable from the felly 13 by releasing the bolts 31 while the tread blocks 14 may be detached by removing the pintle bolts 24. It will be understood that during the movement of the wheel over the roadbed, the blocks 14 will be depressed toward the hub 12 under load conditions and upon meeting obstructions so that the hub 12 will be resiliently mounted for purposes of heavy structure. Any of the members may be readily detached and renewed when found desirable, it being an easy matter to quickly remove one of the tread blocks 14 and replace the same with a new block.

What we claim as new is:—

A device of the class described comprising a wheel having a felly, a rim detachably mounted upon the said felly, parallel side plates carried by the said rim, radially arranged blocks slidably positioned between the said plates having transverse slots therein, guide bolts carried by the said plates projecting inwardly of the said blocks, the said blocks having central inwardly opening sockets, springs carried by the said rim seated within the said sockets, transverse partitions carried by the rim connecting the said plates, the said blocks being arranged in pairs with the opposite ends of the blocks of each pair cut-away forming clearance for the partitions between which the said blocks are positioned.

In testimony whereof we affix our signatures.

JOHN TÓTH.
JOSEPH NOVAK.

Copies of this patent may be obtained for five cents each, by addressing the "Commissioner of Patents, Washington, D. C."